No. 698,448. Patented Apr. 29, 1902.
W. L. CALDWELL.
MACHINE FOR MANUFACTURING EXPANDED SHEET METAL.
(Application filed Sept. 21, 1900. Renewed Oct. 8, 1901.)
(No Model.) 8 Sheets—Sheet 1.

WITNESSES:
Lew. E. Curtis

INVENTOR:
WILLIAM L. CALDWELL
BY
Munday, Evarts and
Adcock.
HIS ATTORNEYS

No. 698,448. Patented Apr. 29, 1902.
W. L. CALDWELL.
MACHINE FOR MANUFACTURING EXPANDED SHEET METAL.
(Application filed Sept. 21, 1900. Renewed Oct. 8, 1901.)
(No Model.) 8 Sheets—Sheet 2.

FIG. 2.

WITNESSES:
Lew. C. Curtis
H. W. Munday

INVENTOR:
WILLIAM L. CALDWELL
By Munday, Evarts & Adcock
HIS ATTORNEYS.

No. 698,448. Patented Apr. 29, 1902.
W. L. CALDWELL.
MACHINE FOR MANUFACTURING EXPANDED SHEET METAL.
(Application filed Sept. 21, 1900. Renewed Oct. 8, 1901.)
(No Model.) 8 Sheets—Sheet 3.

WITNESSES:
Lew. E. Curtis
H. M. Munday

INVENTOR:
WILLIAM L. CALDWELL
BY Munday, Evarts & Adcock.
HIS ATTORNEYS

No. 698,448. Patented Apr. 29, 1902.
W. L. CALDWELL.
MACHINE FOR MANUFACTURING EXPANDED SHEET METAL.
Application filed Sept. 21, 1900. Renewed Oct. 8, 1901.)

(No Model.) 8 Sheets—Sheet 4.

WITNESSES:
Lew. E. Curtis
H. W. Munday

INVENTOR:
WILLIAM L. CALDWELL.
BY Munday, Evarts & Adcock.
HIS ATTORNEYS.

No. 698,448. Patented Apr. 29, 1902.
W. L. CALDWELL.
MACHINE FOR MANUFACTURING EXPANDED SHEET METAL.
(Application filed Sept. 21, 1900. Renewed Oct. 8, 1901.)
(No Model.) 8 Sheets—Sheet 5.

Witnesses: Frank S. Blanchard

Inventor: William L. Caldwell
By Munday, Evarts & Adcock
His Attorneys.

No. 698,448. Patented Apr. 29, 1902.
W. L. CALDWELL.
MACHINE FOR MANUFACTURING EXPANDED SHEET METAL.
(Application filed Sept. 21, 1900. Renewed Oct. 8, 1901.)
(No Model.) 8 Sheets—Sheet 6.

Fig. 12.

Witnesses:
Frank Blanchard
A. M. Munday

Inventor:
WILLIAM L. CALDWELL
By Munday, Evarts & Adcock
HIS Attorneys.

No. 698,448. Patented Apr. 29, 1902.
W. L. CALDWELL.
MACHINE FOR MANUFACTURING EXPANDED SHEET METAL.
(Application filed Sept. 21, 1900. Renewed Oct. 8, 1901.)
(No Model.) 8 Sheets—Sheet 7.

Witnesses:
Frank J. Blanchard
H. M. Munday

Inventor:
William L. Caldwell
By Munday, Evarts & Adcock
His Attorneys.

No. 698,448. Patented Apr. 29, 1902.
W. L. CALDWELL.
MACHINE FOR MANUFACTURING EXPANDED SHEET METAL.
(Application filed Sept. 21, 1900. Renewed Oct. 8, 1901.)

(No Model.) 8 Sheets—Sheet 8.

Witnesses:
Frank J. Blanchard
H. W. Munday

Inventor:
William L. Caldwell
By Munday, Evarts & Adcock
His Attorneys.

UNITED STATES PATENT OFFICE.

WILLIAM L. CALDWELL, OF NEW YORK, N. Y., ASSIGNOR OF ONE-HALF TO OSCAR BRADFORD, OF CHICAGO, ILLINOIS.

MACHINE FOR MANUFACTURING EXPANDED SHEET METAL.

SPECIFICATION forming part of Letters Patent No. 698,448, dated April 29, 1902.

Application filed September 21, 1900. Renewed October 8, 1901. Serial No. 78,011. (No model.)

*To all whom it may concern:*

Be it known that I, WILLIAM L. CALDWELL, a citizen of the United States, residing in New York, in the county of New York and State of New York, have invented a new and useful Improvement in Machines for Manufacturing Expanded Sheet Metal, of which the following is a specification.

My invention relates to improvements in machines for the manufacture of expanded sheet metal, which is now largely employed for metallic lathing.

The object of my invention is to produce a simple, effective, and comparatively economical machine for producing expanded sheet metal, the product of which will be strong and more uniform and cheaper than the products of the machines which have heretofore been employed for this purpose.

To this end my improved machine comprises a suitable slitting device consisting, preferably, of a pair of rolls, one of which is formed with a series of circular sheet-carrying counters or fingers, while the other one is provided with a number of circular series of cutters of peculiar construction which coöperate with the said sheet-carrying counters to slit the sheet of metal by a shearing action without the objectionable breaking down or bending of the strands of metal formed by the slits, a suitable stretching or expanding device which is independent of the sheet-slitting device and is adapted to take hold of the edges of the slitted sheet of metal and stretch or expand it uniformly throughout its width, and finally a setting or finishing device consisting of a pair of rolls carrying, respectively, male and female dies, which are adapted to set the walls of the expanded meshes to the desired angle to suit the purpose for which the product is to be employed. In my improved machine the slitting device does nothing but slit the metal sheet in readiness for the action of the stretching or expanding device. The slit sheet may be passed immediately through the expanding and setting devices, or it may be shipped to the desired location and there be subjected to the expanding and setting operations.

In order that my invention may be fully understood, I will first describe the same with reference to the accompanying drawings and afterward point out the novelty more particularly in the annexed claims.

In said drawings.

The machine-frame may be of any suitable construction to properly support the operating parts of the machine and is indicated generally by the reference-numeral 1. Power is given the machine by means of pulley 2 on the cross-shaft 3. This shaft carries a gear 4, which meshes with the gear 5 on the shaft of the lower slitting-roll, and gear 5 meshes with gear 6 on the shaft of the upper slitting-roll. Gear 5 also meshes with the intermediate pinion 7, which in turn drives the pinion 8, and pinion 8 actuates pinion 9. Pinions 8 and 9 are respectively on the shafts of the lower and upper feed-rolls 10 and 11, whereby the sheets are fed from feed-table 12 to the slitting-rolls. Gear 5 also drives an intermediate pinion 13, located in the rear of the slitting-rolls, and through such intermediate pinion drives the pinions 14 and 15 of the rear feed-rolls 16 and 17, acting to feed the slitted sheets from the slitting-rolls to the expanding mechanism.

Referring now more particularly to Figs. 8, 9, 12, and 13 of the drawings, it will be observed that the bearing-blocks 18 and 19 of the shafts 20 and 21 of the slitting-rolls have threaded recesses, in which engage right and left hand adjusting-screws 22, (one at each side of the machine,) by means of which the upper bearing-block and the roll supported by it may be adjusted toward or away from the other bearing and roll, the upper roll being vertically adjustable for the purpose. The purpose of this adjustment is to regulate the lap of the upper-roll cutters with relation to the lower-roll sheet-carrying counters. These cutters and counters overlap only enough to shear completely through the sheet of metal.

The upper shearing or slitting roll is formed of an axle and a large number of narrow cutting-rings secured in close relation upon the axle.

20 is the shaft or axle of the upper roll, journaled at its ends in bearing-blocks 18 and formed with an enlarged central cylindrical portion 23, having a longitudinal key-groove 24 and threaded reduced portions 25 at the opposite ends of the cylindrical portion 23 inside of the journals. The cutter-rings 26 are mounted upon the cylindrical portion 23 of the axle, each ring being formed with an internal groove 27, which engages with a feather-key 28, let into the axle, as stated. A large number of these cutter-rings 26 and two depressor cutter-rings 30 are mounted upon the axle and securely clamped in position between the collars or large washers 31, held by screw-nuts 32, which are threaded upon the portions 25 of the axle. The number of cutter-rings employed upon the cutting-roll will depend upon the width of the metal sheet to be operated upon and the number of meshes desired in the completed article.

Each of the cutter-rings 26 is formed with a series of curved cutters 261, beveled off at 262 and separated by notches or grooves 263. The cutting edges of the cutters of each ring are coincident with the outer circle or circumference of the ring to facilitate sharpening the cutters by grinding. In mounting the cutter-sections upon the axle the cutters of one ring are alternated with respect to the cutters of its neighboring ring, so that the cutters of the whole cylinder will break joint and have a staggered appearance.

At each end of the series of cutting-rings on the cutter-roll is mounted a depressor cutting-ring 30, formed with a series of depressing-cutters 33, which cutters are adapted to depress the metal of the sheet at the side edges simultaneously with the cutting action. The operation of this cutting-roll will be better understood after the description of its coöperating under roll, which supports and carries the sheet between the two slitting-rolls.

The lower member or pair of shearing or slitting rolls is formed of an axle 21, having a central cylindrical portion 37, reduced threaded portions 38, and the sheet supporting and carrying rings or counters, which coöperate with the cutters of the upper roll, just described. Mounted upon the cylindrical central portion 37 of the axle are the sheet-carrying counters or rings 40, which are formed with unbroken circumferences. These counters or rings 40 are mounted upon the cylindrical portion 37 of the axle in the same manner as the cutter-rings 20 are mounted upon their supporting-axle, as above described, a feathered key 41 securing the rings to the axle against rotative movement, while the large washers 42 and nuts 43 securely clamp the rings in position against longitudinal movement upon the axle. It will be understood by referring particularly to Fig. 13 that the outer edges of the counters or rings 40 are beveled at 44 to allow room for the cutters to project below the supporting edges of the counters, which supporting edges are not sharpened, but present comparatively broad edges to support the sheet under the action of the cutters. The cutters and sheet supporting and carrying counters are arranged close together upon their supporting-axles, and the axles are supported in such relation that the vertical faces of the cutters will operate parallel and close to the vertical faces of the counters, the bevel-faces of the counters allowing sufficient room for the overlapping cutting-blades to operate.

Figures 8, 9:
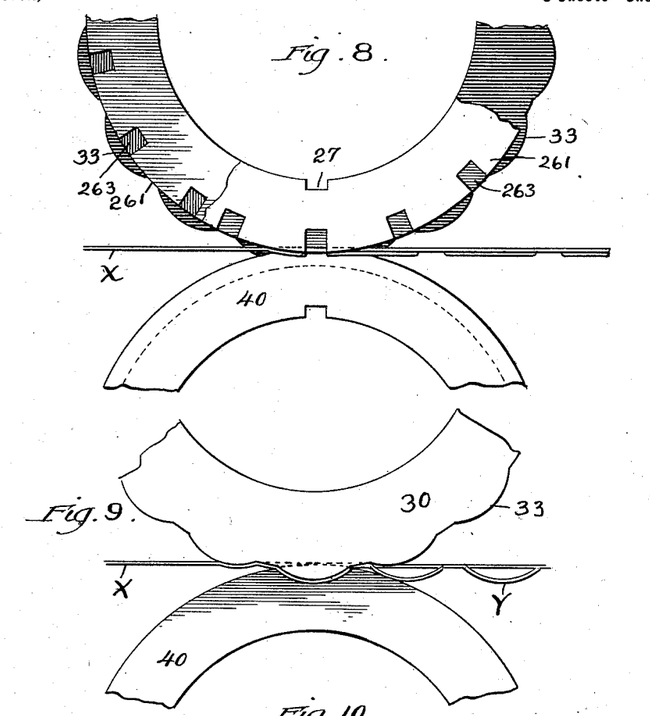
Fig. 8 is a detail view of the cutting device, having parts broken away to better illustrate the arrangement of the cutters.
Fig. 9 is a similar view illustrating the end dies of the rolls which depress the sides of the slit sheet metal to form shoulders for the engagement of the stretching or expanding device.
Figure 10:
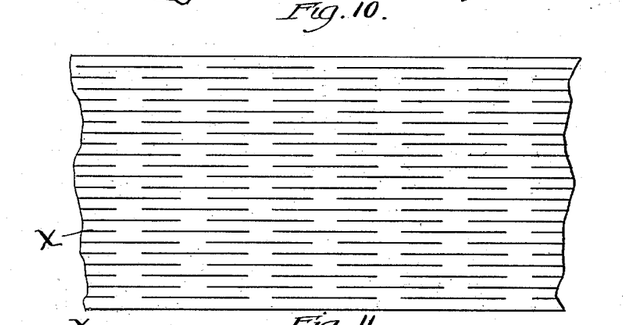
Fig. 10 is a detail plan view illustrating a strip of slit sheet metal after it has passed the slitting device.
Figure 11:
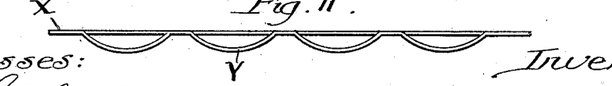
Fig. 11 is an edge view of the same.
Figure 12:
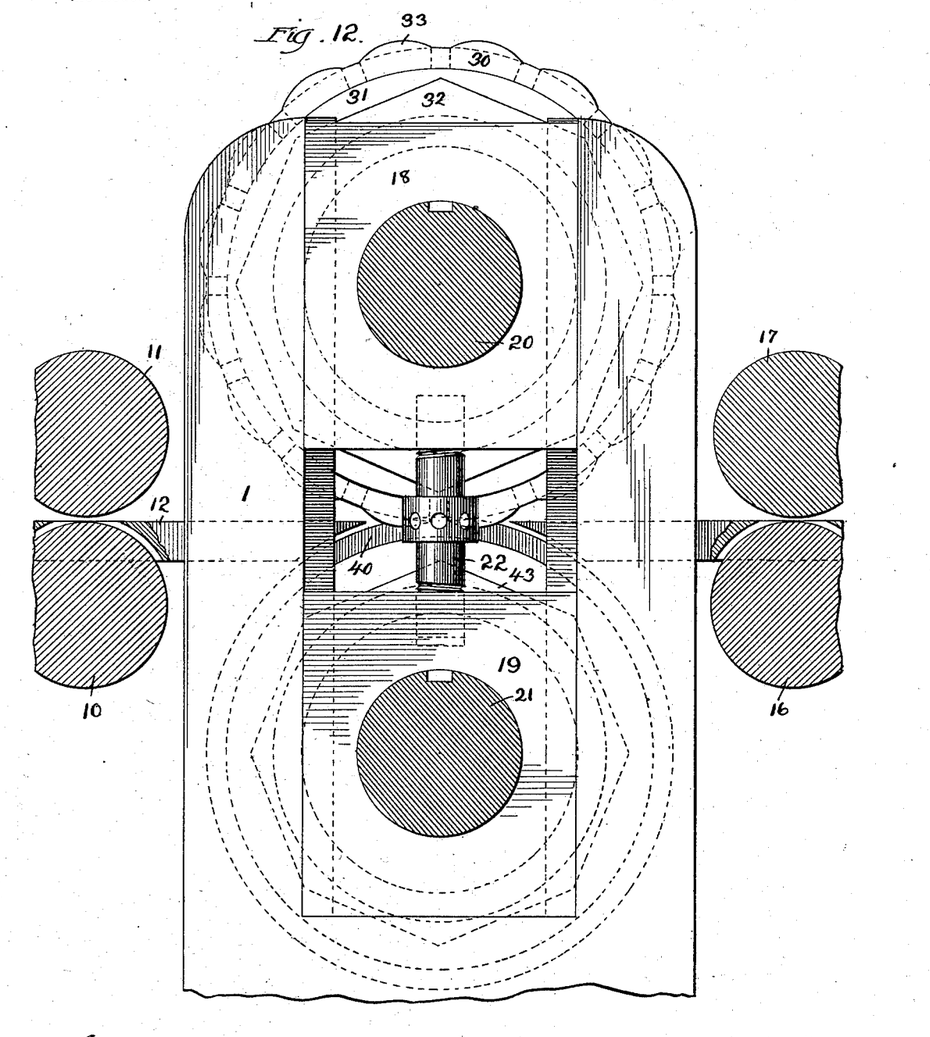
Fig. 12 is a detail side elevation.
Figure 13:
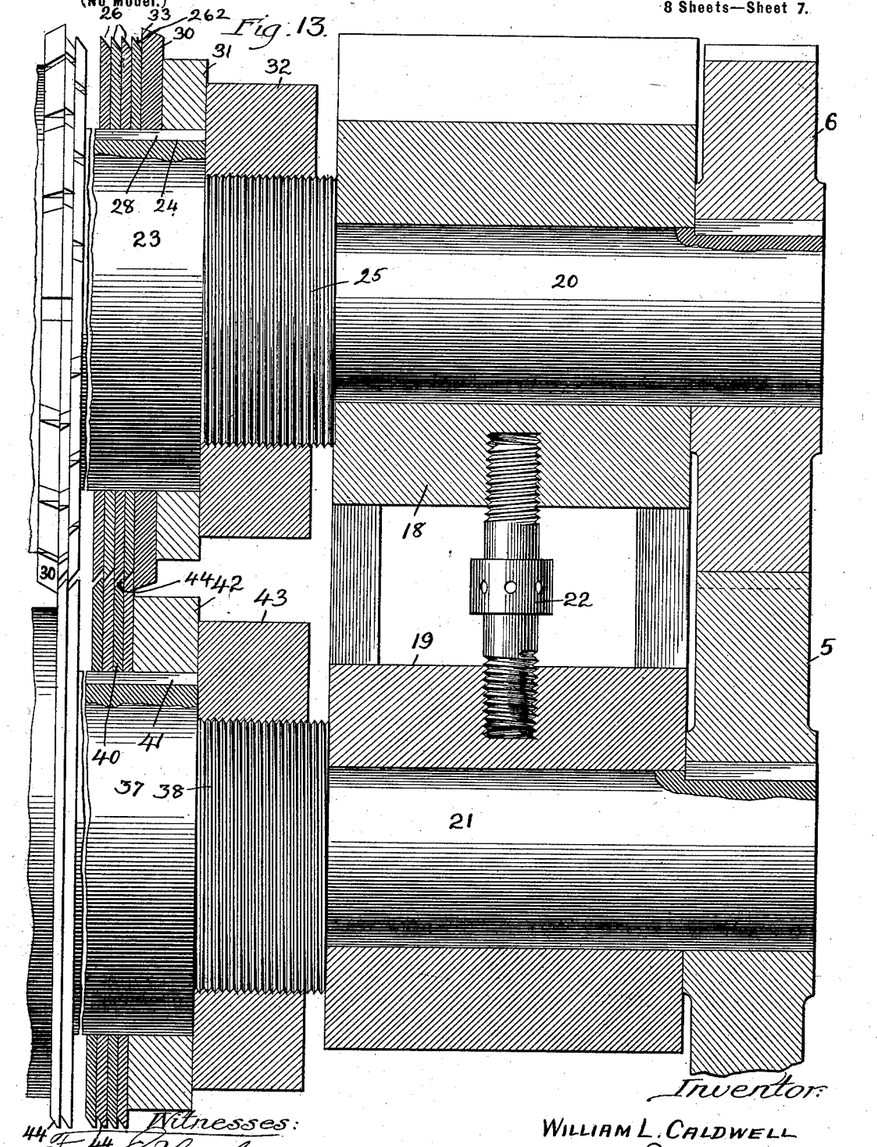
Fig. 13 is a vertical section of the sheet-slitting devices, parts being broken away.

The strip of sheet metal to be expanded is fed upon the table 12 between the slitting-rolls, which produce a slitted sheet X, such as represented in plan view in Fig. 10. The staggered rows of cutting-knives produce the "break-joint" arrangement of slits, as shown. In cutting the slits the small strips of metal remaining between the slits are of course depressed slightly from the normal plane of the original sheet; but this depression of the parts of the sheet metal is very slight, it being in practice about equal to the thickness of the sheet of metal being operated upon. In addition to slitting the sheet, as shown, the depressing-cutters 30 at the ends of the upper roll depress the outer edges of the strip of sheet metal to a much greater degree than the main parts of the slitted metal are depressed. This is illustrated in Figs. 9 and 11 of the drawings, Y being the depressed edge. The purpose of depressing the outer edges of the slitted sheets is to provide means for the engagement of the stretching or expanding device with the sheet, as I will now describe.

A sheet of metal slit as just described and illustrated in Figs. 10 and 11 of the drawings may be passed from the slitting device directly to the metal expanding and setting devices if it is desired to complete the product in one continuous operation. If, however, the product is to be shipped to a great distance, it is more convenient to pack the sheets prepared as shown in Figs. 10 and 11 and complete the expanding and setting operations after they have reached their destination. For expanding or opening the slitted sheet any suitable mechanism may be employed, and the mechanism which I have shown and now describe is but one out of several constructions which might be employed.

Figure 1:
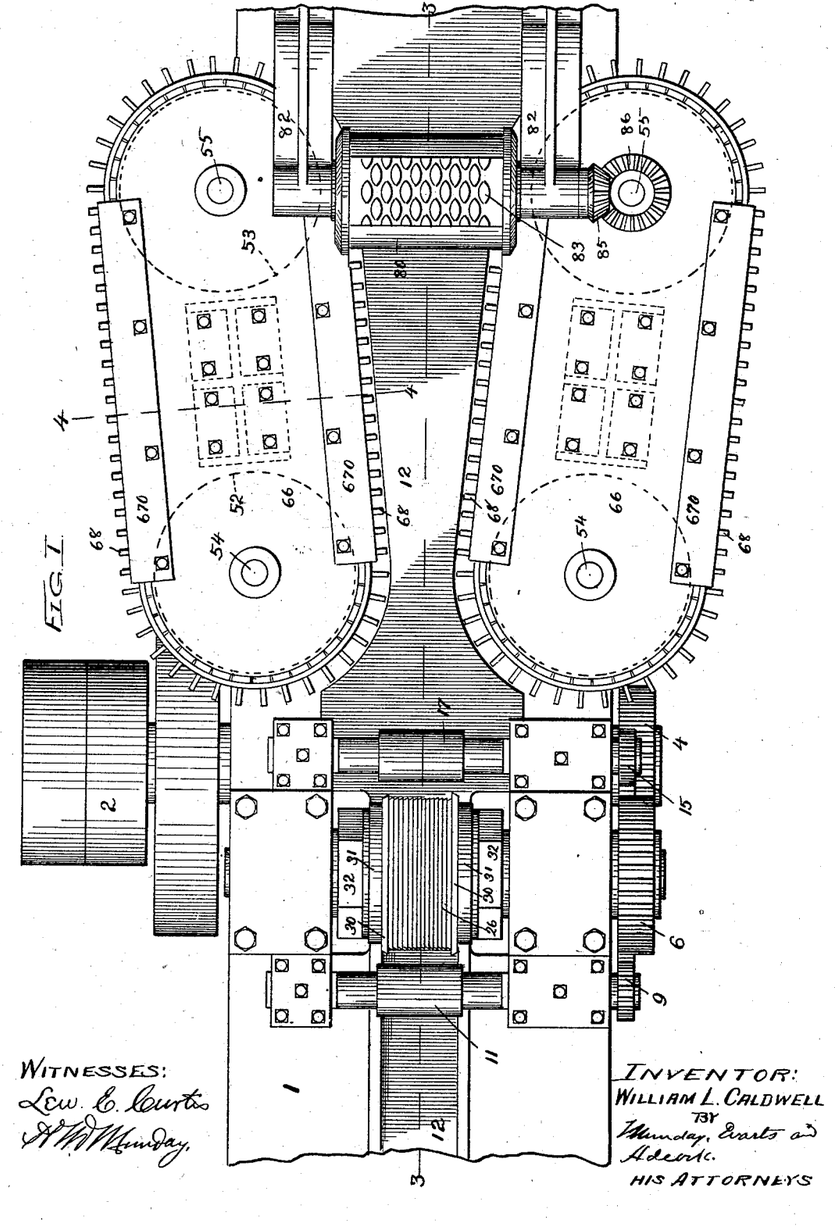
Figure 1 is a plan of my improved machine.
Figure 2:
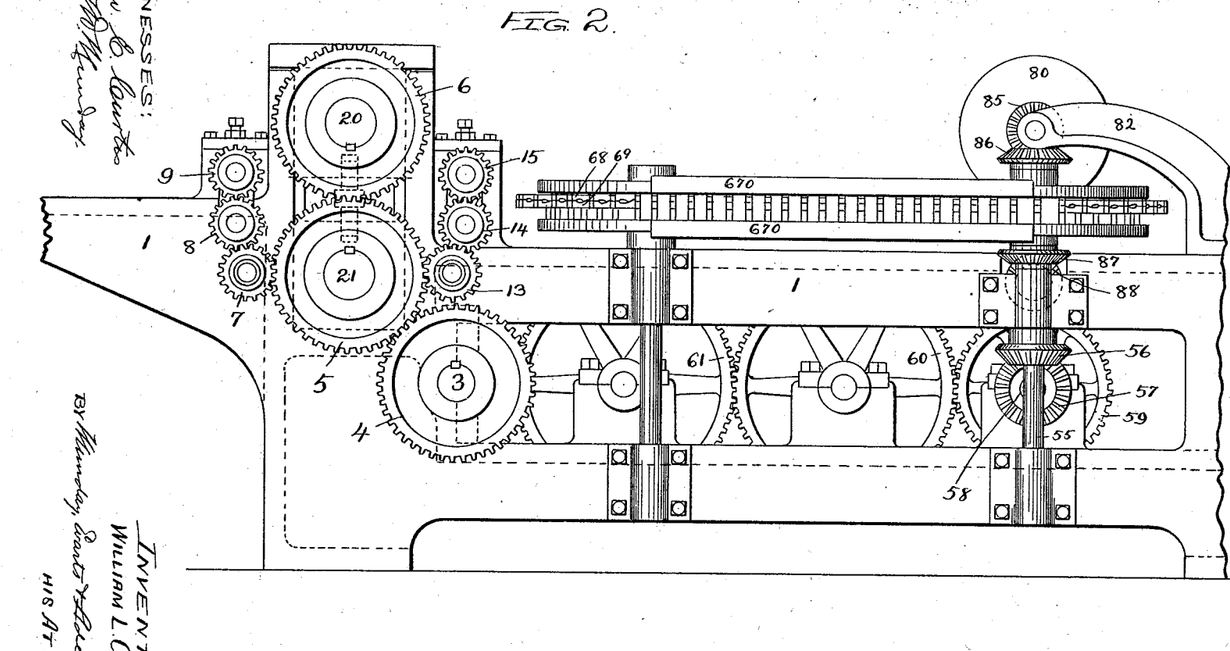
Fig. 2 is a side elevation of the same, parts of the setting or finishing devices being removed for clearness.
Figure 3:
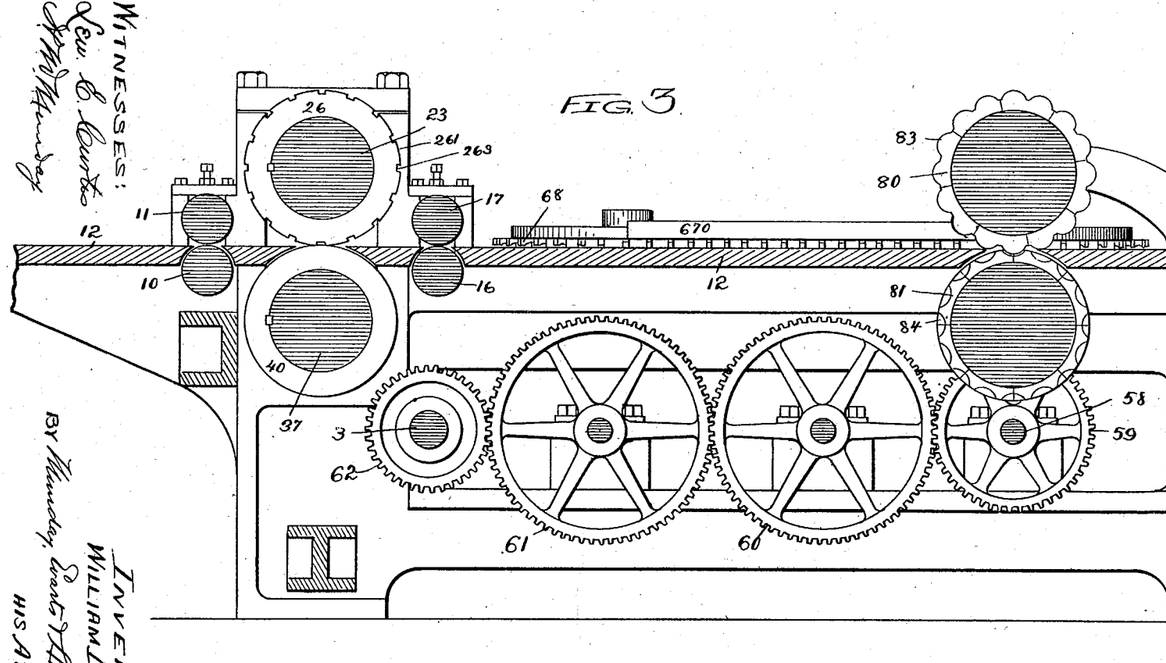
Fig. 3 is a section on the line 3 3 of Fig. 1.
Figure 4:
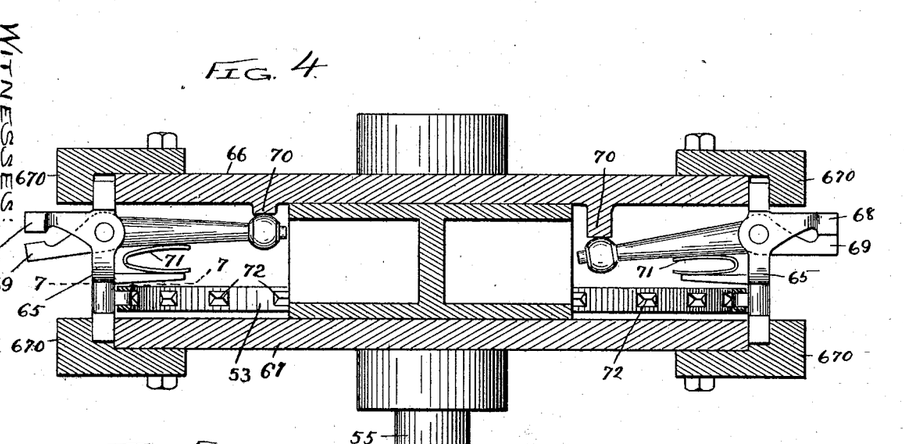
Fig. 4 is a detail vertical section on the line 4 4 of Fig. 1.
Figures 5, 6, 7:
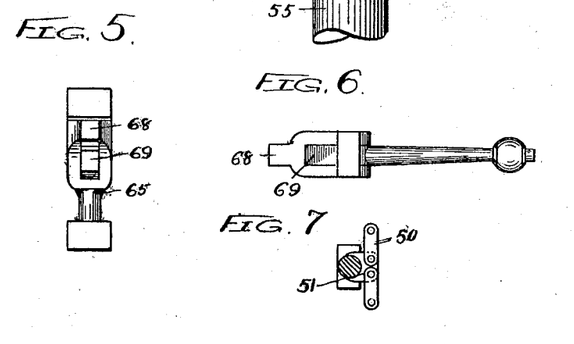
Figs. 5 and 6 are respectively front and plan views of the grippers of the expanding mechanism.
Fig. 7 is a detail section on the line 7 7 of Fig. 4.

The cut sheets pass from the slitting-rolls into the embrace of the feed-rolls 16 and 17, and from thence they move into position where their edges are seized by the expanding mechanism, which in the construction illustrated consists of two traveling chains moving in diverging directions and provided with means for taking hold of the sheet. These chains are best illustrated at Figs. 1, 2, and 4 and consist of alternate pairs of links 50 and gripper-holders 51, pivotally joined together, as shown at Figs. 4 and 7. The chains are endless and are each supported by sprocket-wheels 52 and 53, the former being an idler and the latter being driven. Both sprockets are mounted on vertical shafts, the former on shaft 54 and the latter on shaft 55, and each of the shafts 55 is provided with a bevel-gear 56, meshing with a bevel-pinion 57 on a cross-shaft 58. This latter shaft carries a gear 59, receiving power from shaft 3 by means of the intermediates 60 and 61 and the gear 62. The chains are arranged, as shown in Fig. 1, so that they diverge as they move away from the slitting-rolls, and they are operated at a speed agreeing with that of the rolls. They are provided with suitable means whereby they may take hold of the sheet and open its meshes, and for that purpose each chain is desirably furnished with grippers, as follows: Each holder 51 is attached to and carries an upright standard 65, the upper and lower ends of which traverse ways formed therefor between the outer edges of top and bottom plates 66 and 67 and flanged pieces 670, bolted to said plates and extending through the straight portions of the chain's path. Projecting outwardly from these standards are stationary jaws 68, and pivoted on the standards are movable jaws 69, opposing jaws 68. The inner ends of the movable jaws extend inward and are kept in constant contact with a cam-ridge 70, formed on the under side of the covering-plate 66, by springs 71. The cam closes the movable jaw against the stationary one immediately after the sheet has entered between the jaws and holds such jaw closed until the meshes are opened to the extent desired, when the cam allows the movable jaw to open and release the sheet. In the construction shown the gripper-jaws are positioned so that they will take hold of the depressed portions Y at the edges of the sheet, and one pair of them is shown in their acting position in Fig. 4 and the other pair in their non-acting position. While acting on the sheet the standards 65 are guided and sustained against the resistance of the sheet by the flanged pieces 670, and thereby the chains are relieved of much of the strain. The teeth 72 of the sprocket-wheels enter the vertical spaces between the links and are thus enabled to urge the chains along. When the slitted sheet reaches the expanding-chains, the grippers take hold of it in succession, the first pair engaging the sheet at its initial end and the following pairs taking hold of it successively at points farther back, so that the sheets are subjected to a gradual opening operation, commencing at the forward end and progressing gradually toward the rear end, the forward end being completely expanded in advance of the rest of the sheet. The expanding is done, it will be noticed, in the plane of the sheet, and it will also be noticed that the action of the grippers—the time at which they take hold and at which they let go of the sheet—is regulated by the cam-ridge 70. I prefer to continue the table 12 right through the machine, as plainly shown at Fig. 3, cutting it away to make room for the different rolls.

Figures 14, 15, 16:
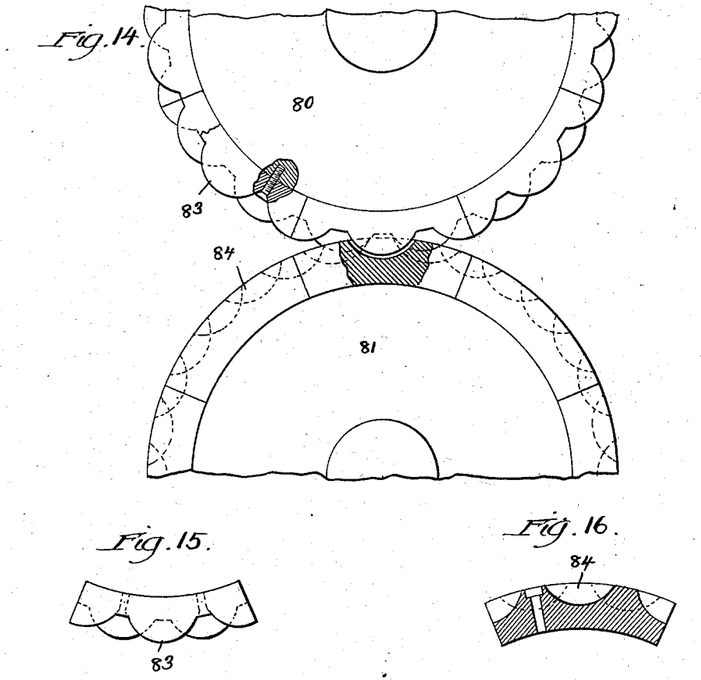
Fig. 14 is a detail sectional end view of the setting dies or rolls.
Figs. 15 and 16 are detail views of single sections of the male and female members of the setting-dies.

Immediately after the sheet has been expanded, as above described, it is very desirable that it should be subjected to some suitable setting device to set the strips or walls of the meshes at the desired angle for the use to which the expanded metal is to be put and also to overcome the natural tendency of the expanded metal to partially return to its original form by reason of its elasticity. For this purpose I employ a pair of setting-rolls 80 and 81, the upper one of which is journaled in the overhanging arms 82 and the lower one is journaled in the main frame. These setting-rolls have secured to their circumference male and female dies 83 and 84, respectively, which dies are formed in segments and are secured to the cylinders in any suitable manner. In Fig. 1 of the drawings only one segment of male dies 83 is shown upon the cylinder 80, the others being omitted for clearness. The shape of these dies will depend upon the amount of stretching or expanding which the sheet has been subjected to and also upon the angle to which it is desired to set the strips of metal forming the walls of the meshes. The general contour of the dies, as shown in the drawings, approximates an oval pyramid, and the walls of the meshes enter or are forced down into the female dies by the male dies, as illustrated at Fig. 14, thus imparting to the walls the angle desired and insuring uniformity in the setting. The setting or finishing rolls may be driven in any suitable manner; but they should be driven at the same surface speed as the cutter-rolls and with the setting-dies in proper register with the meshes of the expanded sheet. I have represented bevel-gears 85 and 86, one upon axle of roll 80 and the other upon shaft 55, and bevel-gears 87 and 88, one on the shaft of roll 81 and the other upon shaft 55.

Figure 17:
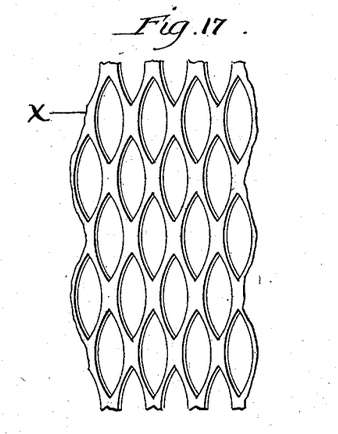
Fig. 17 is a detail plan view of the complete product of expanded sheet metal which is produced by my improved machine.

In Fig. 17 I have represented in a detail view a section of the complete product of expanded sheet metal produced by my improved machine.

My improved machine is comparatively cheap to manufacture and operate. It is much more simple in construction than machines heretofore employed for producing expanded metal. Each part of the machine is relied upon for performing only one function, and the sheet metal is not subjected to any unnecessary strain in producing the expanded metal. Hence the product is stronger.

I would have it understood that my improved sheet-slitting mechanism may be employed in combination with any suitable expanding and setting mechanism, or independently of such mechanism where it is desired to slit the sheet at one location and ship it to another for expanding and setting. I would also have it understood that I claim, broadly, any expanding mechanism taking hold of the edges only of the sheet and carrying them away from each other, substantially as hereinbefore described, and said expanding mechanism may be used in combination with any appropriate slitting mechanism, or independently of such mechanism where the expanding is to be done at a different location from the slitting operation.

I claim—

1. In a machine for the manufacture of expanded sheet metal, the combination of means for cutting or shearing slits in a sheet, independent means for stretching or expanding the slitted sheet, and independent means for setting or fixing the meshes of the expanded sheet, substantially as set forth.

2. In a machine for producing expanded sheet metal, the combination of a suitable shearing device adapted to slit the metal sheet, with a suitable expanding device moving with the sheet and acting to stretch or expand the slitted sheet by power applied to the edges only of the sheet, and means for feeding the slitted sheet from the shearing device to the metal-expanding device, substantially as specified.

3. In a machine for producing expanded sheet metal, the combination of a suitable shearing device adapted to form transversely-staggered series of longitudinal slits in a sheet of metal, with a suitable expanding device moving with the sheet as it comes from the shearing device and adapted to engage the edges only of the slitted sheet and to stretch or expand the sheet laterally, substantially as and for the purpose set forth.

4. In a machine for producing expanded sheet metal, the combination of suitable means for forming transversely-staggered series of longitudinal slits in a sheet of metal, with suitable expanding means adapted to engage the edges only of the slitted sheet and gradually expand it laterally throughout its width as the sheet passes through the expanding means, substantially as set forth.

5. In a machine of the character described, the combination of means for feeding a slitted sheet, with means for engaging the sheet at its edges acting to automatically force them apart and thus expand the sheet as it is fed along, substantially as set forth.

6. The combination of suitable means for feeding a slitted sheet of metal, with automatic means adapted to engage the sheet at its edges only and to gradually expand the sheet laterally as it is fed through the machine, substantially as set forth.

7. The combination of suitable means for feeding a slitted sheet of metal, with means located at the side of the path of the sheet and engaging the edges of the slitted sheet and forcing said edges of the sheet in divergent paths as the sheet is fed along, whereby the slitted sheet will be expanded laterally, as set forth.

8. The combination of suitable means for feeding a slitted sheet of metal in the direction of its length, and means located at the side of and automatically engaging the edges of the sheets and forcing them gradually apart at right angles to the direction of feed, as set forth.

9. In a machine for expanding metal, the combination with means for feeding the slitted sheet longitudinally, of expanding devices located at the sides of the sheet and having lineal movements in directions diverging from the direction in which the sheet is fed, substantially as specified.

10. In a machine for expanding metal, devices for expanding slitted sheets laterally engaging the sheets at their edges and moving with the sheets while expanding them, and means for feeding the sheets to such expanding devices, substantially as specified.

11. In a machine for expanding metal, devices for expanding slitted sheets consisting of diverging traveling chains provided with means for taking hold of the edges of the sheets, substantially as specified.

12. The combination with rolls for slitting the sheet, with means independent of the slitting-rolls, for expanding the sheet while it is moving from the rolls, said expanding means being located at the side of the sheet, and moving with it in its said movement, substantially as specified.

13. The combination with rolls for slitting the sheet, with means independent of the slitting-rolls for expanding the sheet, said expanding means receiving the sheet from the slitting-rolls and acting on it as it moves, and being located at the side of the sheet, substantially as specified.

14. The combination with the setting-rolls having male and female dies for shaping the openings in the sheet uniformly, of means for feeding the expanded sheet to said rolls with the openings in proper register with the dies, substantially as specified.

WILLIAM L. CALDWELL.

Witnesses:
J. H. MANN,
H. A. HILL.